United States Patent

[11] 3,625,999

[72] Inventor Hill M. Priestley
 North Bergen, N.J.
[21] Appl. No. 706,698
[22] Filed Feb. 19, 1968
[45] Patented Dec. 7, 1971
[73] Assignee Lever Brothers Company
 New York, N.Y.

[54] PROCESS FOR THE PREPARATION OF PHOSPHONIUM SULFONATE SALTS
 8 Claims, No Drawings
[52] U.S. Cl........................................ 260/505 R
[51] Int. Cl........................................ C07c 143/24
[50] Field of Search............................ 260/505 R, 501.12

[56] References Cited
UNITED STATES PATENTS

| | | | |
|---|---|---|---|
| 3,255,239 | 7/1966 | Gardenier .................... | 260/501.12 |
| 2,853,518 | 9/1958 | Balon .......................... | 260/553 X |
| 3,828,332 | 3/1958 | Gaertner ...................... | 260/505 |

OTHER REFERENCES

E. Gilbert, Sulfonation and Related Reactions, pp. 148– 151 N.Y., 1965).

Primary Examiner—Howard T. Mars
Assistant Examiner—Leo De Crescente
Attorney—Brumbaugh, Graves, Donohue & Raymond ABSTRACT: A process for the preparation of a phosphonium sulfonate salt or phosphobetaine which comprises mixing in an aqueous medium at a temperature from above 0° C. to below 100° C. an inorganic sulfite with a cyclic or noncyclic ethylenically unsaturated quarternary phosphonium halide at a mole ratio of at least 3:1.

PROCESS FOR THE PREPARATION OF PHOSPHONIUM SULFONATE SALTS

Phosphonium sulfonate salts have been prepared heretofore by a variety of methods, one of which is set forth in U.S. Pat. No. 2,828,332. In accordance with the present invention, there is provided a further and more convenient process for the preparation of phosphonium sulfonate salts or phosphobetaines which general class of compounds is known to be useful as surfactants or as biological toxicants, for example, as mothproofing agents, fungicides, bactericides, herbicides, insecticides, nematocides and the like.

In the process of the present invention a cyclic or noncyclic ethylenically unsaturated quaternary phosphonium halide is reacted with an inorganic sulfite. The reaction is conducted in an aqueous reaction medium. The temperature for the reaction may range from above 0° C. to below 100° C., for example, at room temperature. In the reaction the inorganic sulfite and phosphonium halide are mixed together at a mole ratio of at least about 3:1.

Suitable inorganic sulfite reactants include ammonium sulfite, sodium sulfite, potassium sulfite and the like.

The phosphonium halide reactants are exemplified by the compounds having the following structural formulas:

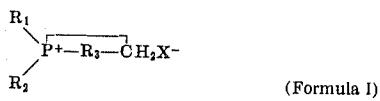
(Formula I)

(Formula II)

wherein $R_1$ is an alkyl radical having from 10 to 18 carbon atoms, e.g., decyl, dodecyl, tridecyl, tetradecyl, hexadecyl, heptadecyl and octadecyl radicals; $R_2$ is an aryl radical having from 6 to 10 carbon atoms, e.g., phenyl, tolyl, benzyl, xylyl, dimethyl phenyl and naphthyl; $R_3$ is an ethylenically unsaturated alkylene radical having three carbon atoms or such mono- and di-methyl-substituted alkylene radicals, e.g., —$CH_2$—CH = CH—, —CH = CH—$CH_2$—, —$CH_2$—$C(CH_3)$ = CH—, and —$CH_2$—$C(CH_3)$ = $C(CH_3)$—; $R_4$ and $R_5$ are the same or different alkenyl radicals having from 2 to 18 carbon atoms, e.g., propenyl, allyl, pentenyl, decenyl, tetradecenyl and octadecenyl; and X is a halogen anion, e.g., chlorine, bromine and iodine.

Illustrative examples of the cyclic ethylenically unsaturated quaternary phosphonium halide reactants having structural Formula I include octadecylphenyl-3-methyl-3-phospholenium bromide; decyltolyl-2-phospholenium chloride; heptadecylbenzyl-3,4-dimethyl-3-phospholenium iodide; tridecylnaphthyl-3-methyl-2-phospholenium bromide; and tetradecylxylyl-2,3-dimethyl-2-phospholenium chloride.

Exemplary noncyclic ethylenically unsaturated quaternary phosphonium halide reactants having structural Formula II include diallyldodecylphenylphosphonium bromide, dipropenylphenyltetradecylphosphonium bromide, didecenylhexadecyltolylphosphonium chloride, allyloctadecenyltridecylxylylphosphonium iodide, tetradecenyloctadecenylheptadecylnaphthylphosphonium chloride and pentyldecenyloctadecylbenzylphosphonium iodide.

The phosphonium sulfonate salts or phosphobetaines produced by the process of the invention have the following structural formulas, Formula III compounds being derived from Formula I compounds and Formula IV and V compounds being derived from Formula II compounds:

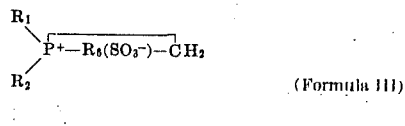
(Formula III)

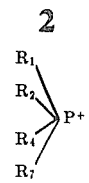
(Formula IV)

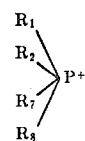
(Formula V)

wherein $R_1$, $R_2$ and $R_4$ are as defined above; $R_6(SO_3^-)$ is the saturated alkylene sulfo anion derivative of $R_3$, e.g., —$CH_2$—$CH(SO_3^-)$—$CH_2$—, —$CH_2$—$CH_2$—$CH(SO_3^-)$—, —$CH(SO_3^-)$—$CH_2$—$CH_2$—, —$CH_2$—$CH(SO_3^-)$—$CH_2$—, —$CH_2$—$C(CH_3)(SO_3^-)$—$BCH_2$—, —$CH_2$—$CH(CH_3)$—$CH(SO_3^-)$—, —$CH_2$—$CH(CH_3)$—$C(CH_3)(SO_3^-)$—and —$CH_2$—$C(CH_3)(SO_3^-)$—$CH(CH_3)$—; $R_7$ is the sulfoalkyl anion derivative of $R_5$, i.e., the alkyl radical corresponding to the $R_5$ alkenyl radical and bearing a negatively charged $SO_3^-$ portion; and $R_8$ is a salt of the sulfoalkyl derivative of $R_4$, i.e., the alkyl radical corresponding to the $R_4$ alkenyl radical and bearing a neutral $SO_3M$ portion attached to carbon where M is the cation corresponding to the cation of the inorganic sulfite reactant employed.

Illustrative examples of the phosphonium sulfonate slat reaction products having structural Formula III include octadecylphenyl-3-methyl-3-phospholanium sulfonate, octadecylphenyl-3-methyl-4-phospholanium sulfonate, decyltolyl-2-phospholanium sulfonate, heptadecylbenzyl-3,4-dimethyl-3-phospholanium sulfonate, tridecylnaphthyl-3-methyl-2-phospholanium sulfonate and tetradecylxylyl-2,3-dimethyl-2-phospholanium sulfonate.

Exemplary phosphobetaine reaction products having the structural Formula IV include phenylallyl (2-sulfopropyl) dodecyl phosphobetaine, phenylallyl (3-sulfopropyl) dodecyl phosphobetaine and phenylpropenyl (2-sulfopropyl) tetradecyl phosphobetaine.

Typical phosphobetaine reaction products having the structural Formula V include phenyl (2-sodium sulfopropyl) (2-sulfopropyl) tetradecyl phosphobetaine, phenyl (2-ammonium sulfopropyl) (2-sulfopropyl) dodecyl phosphobetaine and the like.

Illustrative examples of the process of the invention are set forth below.

EXAMPLE 1

Preparation of (octadecyl) (phenyl) (3-methyl) phospholanium sulfonates (1)

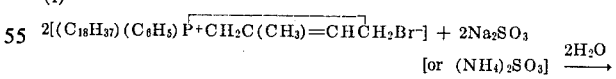

(2)

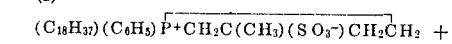

(3)

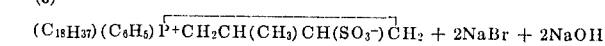

Equal molar quantities of octadecyl bromide and 1-phenyl-3-methyl phospholene (prepared as shown in U.S. Pat. No. 2,853,518) were heated at 105°–115° C. for 2 hours in an atmosphere of nitrogen. One part of the crude phosphonium bromide (compound (1) above), namely, octadecylphenyl-3-methyl-3-phospholenium bromide, was dissolved in 20 parts of water, and this was added to 50 parts of 10 percent sodium sulfite solution. A precipitate began to form in about five minutes. The mixture was allowed to stand at room temperature for 1 hour. The solid was filtered, washed with a little distilled water and dried. The yield was 0.8 parts of octadecylphenyl-3-methyl-3-phospholanium sulfonate and octadecylphenyl-3-methyl-4-phospholanium sulfonate. [Isomeric compounds (2) and (3) above].

Analysis

Calculated for $C_{29}H_{51}O_3PS$: C 68.19; H 10.06; S 6.28; P 6.08; O 9.40

Found: C 67.55; H 10.11; S 6.99; P 5.60; O 9.25.

The above isomeric phosphonium sulfonate salts or phosphobetaines were prepared by the use of ammonium sulfite solution (pH 8.1) as shown below.

One part of the crude phosphonium bromide prepared above [Compound (1) above] was dissolved in 20 parts of water, and this was added to 10 parts of ammonium sulfite dissolved in 25 parts of water. After a minute, a precipitate formed. This was filtered off, washed with a little water, and dried. The elemental analysis is the same as that given above.

EXAMPLE 2

Preparation of phenylallyl (sulfopropyl) dodecyl phosphobetaines

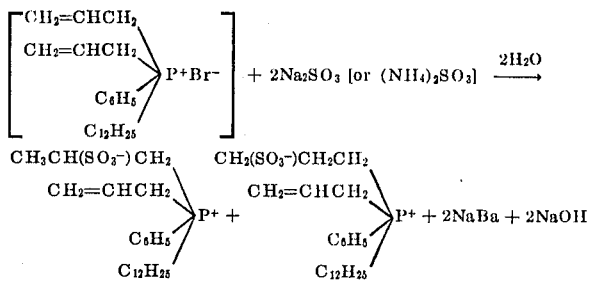

One part of diallyldodecylphenylphosphonium bromide [prepared by heating for 2 hours at 105°–115° C., in a nitrogen atmosphere, equimolar quantities of diallylphenylphosphine (Jour. of the Chem. Soc., 1947, p. 1448) and dodecyl bromide] was dissolved in 10 parts of water, and the solution added to 20 parts of a saturated aqueous sodium sulfite solution. The mixture was stirred for 30 minutes at room temperature, and then extracted with 40 parts of chloroform. Removal of the solvent left 0.94 part of a syrup, which was dispersible in water.

Analysis

Calculated for $C_{24}H_{41}O_3PS$: C 65.42; H 9.38.

Found: C 64.00; H 9.26; Na 0.0 percent.

The above isomeric mixture of phenylallyl (2-sulfopropyl) dodecyl phosphobetaine and phenylallyl (3-sulfopropyl) dodecyl phosphobetaine was also prepared by the use of ammonium sulfite as shown below.

One part of the phosphonium bromide prepared above was dissolved in 5 parts of water, and the solution added to a solution of 2 parts of ammonium sulfite in 5 parts of water. The precipitate which formed was extracted with chloroform. Removal of the solvent left behind the crude isomeric phosphobetaines. The elemental analysis is the same as that given above.

EXAMPLE 3

Phosphobetaine from dipropenylphenyltetradecylphosphonium bromide and aqueous sodium sulfite

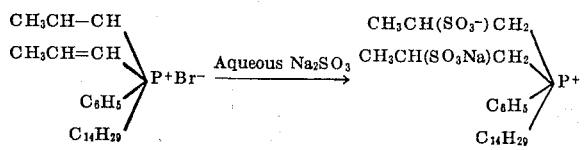

Dipropenylphenyltetradecylphosphonium bromide was prepared by heating for 8 hours at 105°–115° C. equimolar quantities of tetradecyl bromide and dipropenylphenylphosphine (Jour. Chem. Soc. 1947, p. 1448, using propenyl bromide, Mg, tetrahydrofuran, and methyl iodide to initiate the Grignard). The crude phosphonium bromide was treated with aqueous sodium sulfite, as described in example 2. The phenyl (2-sodium sulfopropyl) (2-sulfopropyl) tetradecyl phosphobetaine reaction product is soluble in water, and is neutral to litmus.

Analysis

Calculated For $C_{26}H_{46}O_6PS_2$: C 54.40; H 8.10; Na 4.02

Found: C 54.68; H 8.21; Na 3.23

Various modifications and changes may be made in the process of the invention by those skilled in the art without departing from the essence thereof and accordingly the invention is to be limited only within the scope of the appended claims.

What is claimed is:

1. A process for the preparation of a phosphonium sulfonate salt which comprises mixing in an aqueous medium at a temperature from above 0° C. to below 100° C. an inorganic sulfite selected from the group consisting of ammonium sulfite, sodium sulfite and potassium sulfite with an ethylenically unsaturated quaternary phosphonium halide at a mole ratio of at least about 3:1, said phosphonium halide being selected from the group consisting of

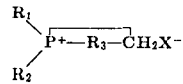

and

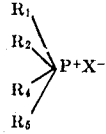

wherein $R_1$ is an alkyl radical having from 10 to 18 carbon atoms, $R_2$ is an aryl radical having from 6 to 10 carbon atoms, $R_3$ is an alkylene radical selected from the group consisting of ethylenically unsaturated alkylene radicals having three carbon atoms and such mono-and di-methyl-substituted alkylene radicals, $R_4$ and $R_5$ are alkenyl radicals having from 2 to 18 carbon atoms and X is a halogen anion selected from the group consisting of chlorine, bromine and iodine.

2. The process as defined by claim 1 wherein the phosphonium halide is octadecylphenyl-3-methyl-3-phospholenium bromide.

3. The process as defined by claim 1 wherein the phosphonium halide is diallyldodecylphenylphosphonium bromide.

4. The process as defined by claim 1 wherein the phosphonium halide is dipropenylphenyltetradecylphosphonium bromide.

5. The process as defined by claim 1 wherein the inorganic sulfite is ammonium sulfite.

6. The process as defined by claim 1 wherein the inorganic sulfite is sodium sulfite.

7. The process as defined by claim 1 wherein the inorganic sulfite is potassium sulfite.

8. The process as defined by claim 1 wherein the temperature is room temperature.

* * * * *